May 23, 1961 V. L. PEICKII ET AL 2,985,475
FACE SEALS

Filed May 19, 1958 3 Sheets-Sheet 1

May 23, 1961   V. L. PEICKII ET AL   2,985,475
FACE SEALS

Filed May 19, 1958   3 Sheets-Sheet 2

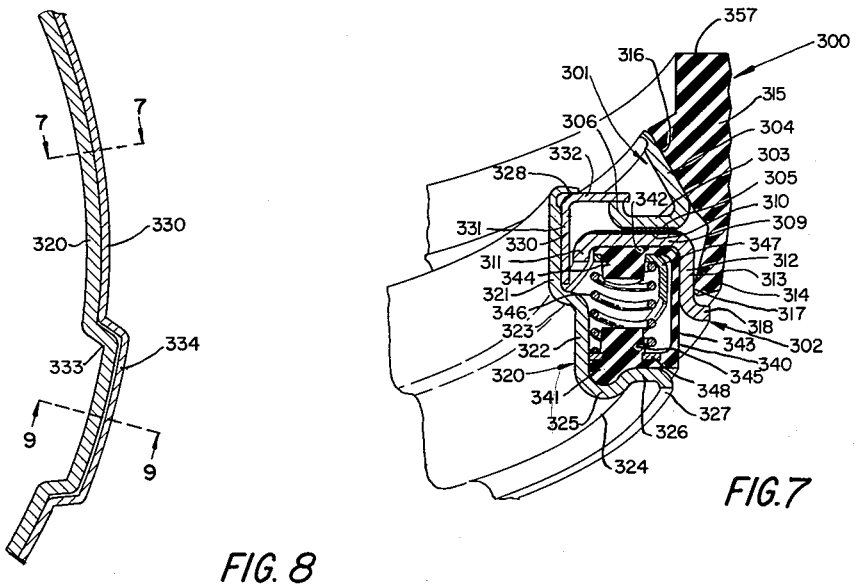
FIG. 7
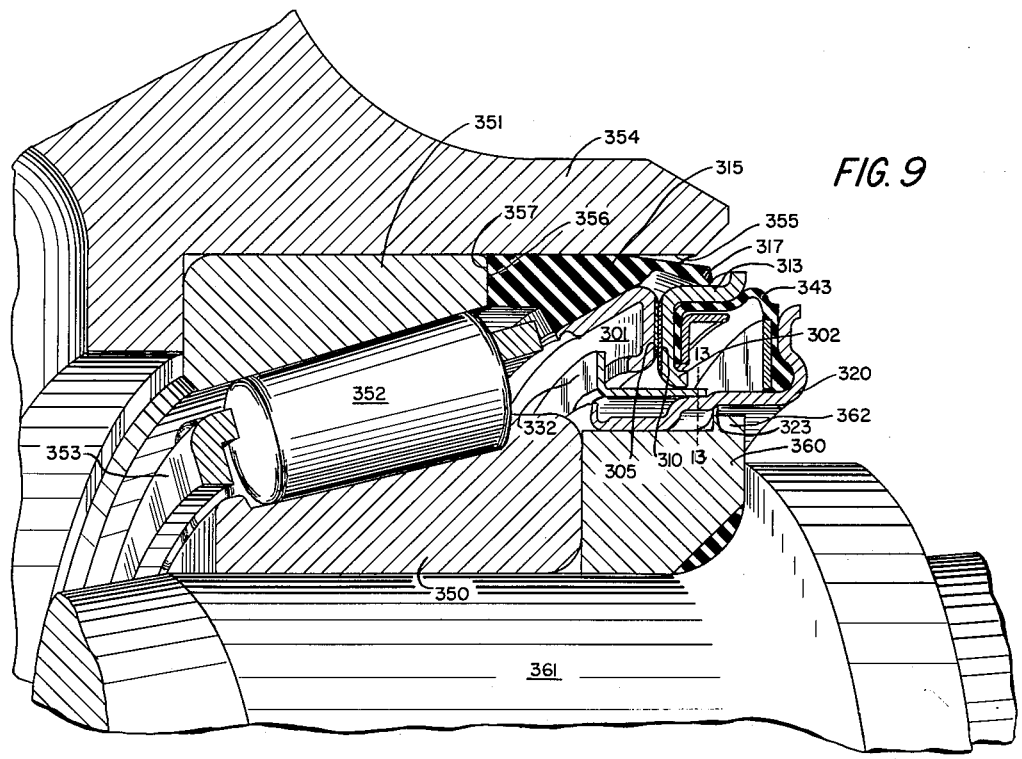
FIG. 8
FIG. 9

United States Patent Office 2,985,475
Patented May 23, 1961

2,985,475
FACE SEALS

Vasalie L. Peickii, Hillsborough, and Joseph E. Lepetich, Los Altos, Calif., assignors to Federal-Mogul-Bower Bearings, Inc., Detroit, Mich., a corporation of Michigan Filed May 19, 1958, Ser. No. 736,100

15 Claims. (Cl. 288—3)

This invention relates to an improved face seal. The invention also relates to improvements in face seals of the unitized type which are sold and installed as a unit, in contrast to face seals comprising several separate elements which have to be separately installed.

Mechanical seals of the face type are very efficient in providing a positive fluid seal between a housing and a relatively rotating shaft, but heretofore they have been expensive to manufacture, and their accurate installation has been tedious. Often, the sealing faces have been damaged by abrasive foreign matter getting in between the faces during or prior to installation; then the assembled faces have not sealed tightly against each other, and the dirt or other foreign matter has been ground into the faces producing permanent scratches. These are, in brief, the general problems which this invention solves.

One reason why face seals have heretofore been expensive is that the two face elements have heretofore been machined individually and from two different kinds of materials. Conventionally, one face has been machined from a thick solid piece of high-grade metal, so that both the material and its machining have been expensive. The other element has conventionally been made from less rigid material such as bearing metal or brass, or from non-metallic materials such as carbon. This less rigid element was also machined, either from solid bar stock or from specially formed rings. Wear of the mating surfaces during their relative rotation was primarily prevented by the selection of two materials with low coefficient of friction relative to each other. Lubrication by a thin film of the material being sealed is always of assistance but cannot be relied upon as the sole factor in wear prevention. The heavy metal face sealing members were either machined to provide an integral supporting portion, or the face-sealing member was mounted in a completely separate supporting member. The use of a separate metallic supporting member was general with carbon and other non-metallic faces, the carbon face element being cemented or otherwise secured to the supporting member, and this has meant that the supporting members, too, had to be carefully machined.

The present invention has solved this problem by providing a way in which both face sealing elements may be formed from the same kind of inexpensive sheet metal. Press-formed sheet steel may be formed to provide flat rings, and these rings may then be reformed to provide supporting flanges that impart a desired degree of rigidity to the radial portions that are to provide the sealing faces. In many instances it is desirable for one radial face member to have greater sectional rigidity than the other, and these different rigidities can be obtained by forming flanges of different axial length or different radial position or both. The invention incorporates the use of certain preferred treating or coating materials, although, as will soon be made apparent, many such materials are suitable.

As indicated above, the present invention comprises a unitized seal, the term "unitized" being used to indicate a seal in which both face elements are assembled at the factory, together with the other elements (springs, cases, etc.) of the complete face seal so that installation of a seal merely involves insertion of a single unit in the housing bore and around the shaft. Unitization solves many problems. For example, when two face elements were installed separately (one face sometimes being a machined portion of the housing or the shaft), dirt or other foreign matter was liable to get in between them, or on one of them; then, during the initial run-in, the foreign material would scratch one or both faces and damage the seal irreparably. Also, one or both faces were sometimes directly damaged or scratched during or previous to installation. In the completely unitized face seal of the present invention, the face elements are carefully assembled, usually under oil, in carefully controlled factory conditions and, once assembled, are held together so that they will not come apart at any subsequent time. Moreover, when installed, the face seal is automatically adjusted to the proper operating position. Injury to the face sealing element prior to and during installation is prevented; proper adjustment upon installation is assured, and the product is easier to handle and gives more uniform results.

Another problem met in certain classes of face seal installations has been the ability of dirt, moisture, and other foreign matter to work in between the faces after they have been installed and while they are being used. for example, face seals installed on truck axles and other places have had dirt, mud, water and so on flung up against them. The present invention comprises a novel combination of the face seal with a radial-type of shaft seal which serves to exclude mud, dirt and other injurious elements from between the face sealing elements. This novel combination can be used in applications where the problem is presented.

Among the objects of the invention are the following: to construct a face seal wherein the face sealing elements are flanged, sheet metal rings; to provide a unitized face seal using sheet metal face elements; to provide a combination between sheet metal face elements and elastomeric elements, thereby assuring snug sealing engagement of the seal with the shaft and housing bore; to protect the sealing faces prior to, during, and after installation from direct damage and from inclusion of foreign matter; and to make installation simple and fool-proof.

Other objects and advantages of the invention will appear from the following description of some preferred embodiments of this invention. These embodiments are presented as illustrative examples and by no means exhaust the numerous practical possibilities which the invention provides.

Fig. 7 is a fragmentary view in perspective and partly in section of another unitized face seal embodying a still further embodiment of the invention. The section is taken along line 7—7 in Fig. 8. The seal is shown in its pre-installation position.

Fig. 8 is a fragmentary sectional view of a portion of the seal of Fig. 7.

Fig. 9 is a fragmentary view in perspective and partly in section of an installation incorporating the face seal of Fig. 7, but taken in this instance along the line 9—9 in Fig. 7 and with the seal elements in their operational position.

Figure 1:
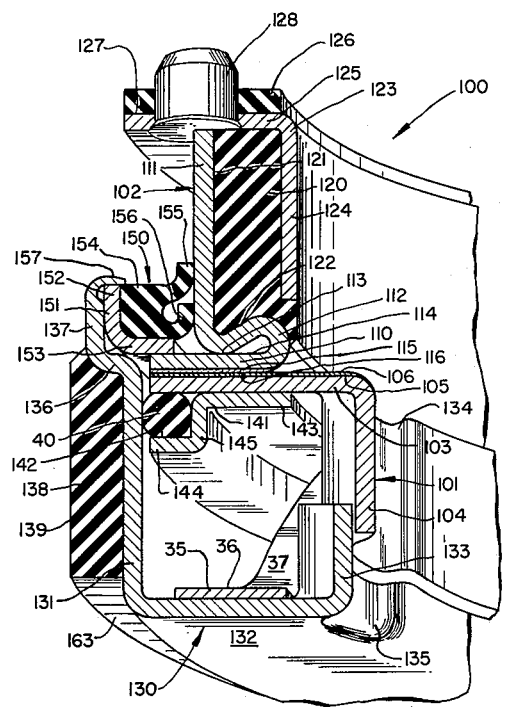
Fig. 1 is a fragmentary view in perspective and partly in section of a unitized face seal embodying the principles of the invention. The seal is shown in its pre-installation position.

Fig. 1 shows a face seal 100 embodying the principles of the invention and comprising two face sealing elements 101 and 102 made from sheet metal.

The member 101 comprises a flange 103 and an axial supporting flange 104. The flange 103 is coated with ceramic 105 and lapped to provide one of the radial sealing faces 106.

The other face element 102 has a radial flange 110 and an axially extending cylindrical portion 111 connected to the radial portion 110 by a sharp radius portion 112 so that a portion 113 of the axial flange 111 rests against the back side 114 of the flange 110. The flange 110 is coated with ceramic 115 and lapped to provide the second radial sealing face 116. This type of flange and flange-supporting construction of the element 102 may be referred to as a "shotgun case" type of structure.

A heavy rubber or synthetic elastomeric reinforcing body 120 is bonded to the radially inner surface 121 of the cylindrical portion 111 as well as the back side 122 of the radius portion 112. The body 120 is further reinforced by a sheet metal ring 123 having a cylindrical portion or axial flange 124 and also having a radial flange 125. The radial flange 125 may be provided with a gasket 126 against its axially outer surface 127 and may also support torque-lock pins 128 for securing it for rotation with a shaft, as described later.

The face sealing element 101 is torque-locked to a case 130 having a radially outer cylindrical portion 131, a radially extending web 132, and a radially inner, axially in-turned flange 133. Torque-lock between the case 130 and the member 101 may be provided by axially extending radial ribs 134 and 135 formed in the two members at spaced points around the periphery. The case 130 is also provided with a radially outwardly extending step portion 136 leading to an axially extending portion 137. An elastomeric body 138 is bonded to the outer surfaces of the cylindrical portion 131 and radial step 136 and its outer periphery 139 is adapted for snug sealing engagement with a bore into which the seal 100 is inserted, being slightly oversize.

Figure 5:
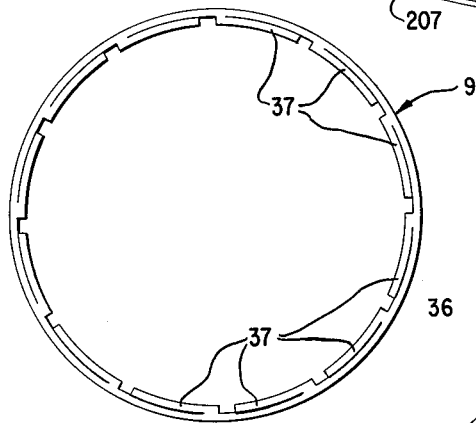
Fig. 5 is a top plan view of a complete finger spring
Figure 4:
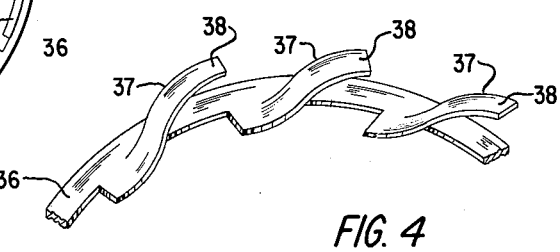
Fig. 4 is a fragmentary view in perspective of a portion of a finger spring like those used in the seals of Figs. 1–3.
Figure 6:
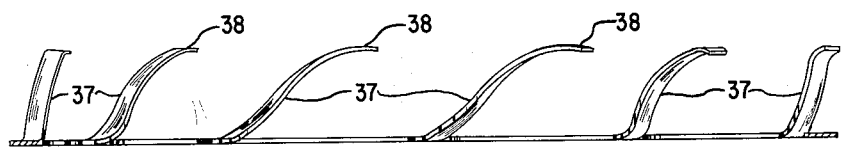
Fig. 6 is an enlarged view in side elevational and partly in section of the finger spring of Figs. 4 and 5.

The faces 106 and 116 are urged into engagement with each other at all times by a suitable resilient compression member; namely, a finger spring 35 best shown in Figs. 4 through 6. The spring 35 has a base member 36 from the outer periphery of which a series of fingers 37 extend out in an axial direction. Each finger 37 terminates in a short, substantially flat, upper end portion 38, and the slope of the fingers 37 is preferably substantially constant. This makes it possible to obtain substantially equal pressure around the spring 35 and, within the limited distance concerned, to obtain movement directly proportional to the pressure exerted on the spring.

It is, of course, necessary to prevent leakage of oil through the case 130 around the faces 106 and 116. For this purpose an elastomeric O-ring 40 is provided in combination with an annular, pressed-steel, keeper member 141. The keeper member 141 serves to provide an O-ring cavity 142 without any necessity for machining a groove into solid metal. The spring end portions 38 bear directly against a radial portion 143 of the step-wise keeper 141, which in turn rests against the back side of the flange 103. The radial portion 143 is connected to another radial portion 144 of the keeper ring 141 by an axial portion 145. The groove 142 is thus provided by the axial portion 145, the radial portion 144, and the radial portion 146 of the back side of the flange 103. The spring 35 maintains the size of the groove for face 142. Thus, the spring 35 both keeps the elastomeric O-ring 40 in place and holds the two sealing faces 106 and 116 in sealing contact. When putting the seal 100 together, the faces are preferably assembled with oil or under oil.

A novel feature of the seal 100 is its incorporation of a shaft sealing unit 150 to lock out moisture, dirt, and other foreign matter and prevent their getting in between the faces 106 and 116. The unit 150 comprises a reinforcing sheet metal case 151 having an axially extending cylindrical portion 152 and a radial portion 153, into which a body 154 of elastomeric material is bonded. The body 154 is provided with a pair of lips 155 and 156. (This seal 150 may be considered an embodiment of the seal claimed in patent application Serial No. 533,597 filed December 16, 1955, by Harold P. Sipperly, now abandoned. The seal 150 is held in place by a turned-over radially in-turned flange 157 on the case 130 which engages the flange 152 when the spring is forcing the seals to their outermost position. The flange 157 also serves to unitize the seal 100.

Figure 2:
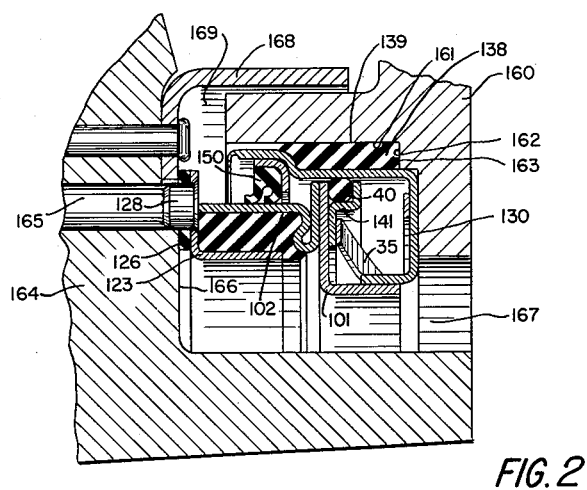
Fig. 2 is a view in elevation and in section, on a reduced scale as compared with Fig. 1, of the upper portion of an installation incorporating the face seal of Fig. 1, the seal elements now being in their operational positions.

Fig. 2 shows a portion of a tractor final drive incorporating the seal 100. A frame member or housing 160 provides a bore 161 with end wall 162 in which the elastomeric body 138 fits with its radial end wall 163 in contact with the wall 162. The locking pins 128 provide a torque lock for the member 102 and its associated elements with a rotating hub 164 by engaging openings 165 therein. The gasket 126 engages the wall 166 and prevents leakage at that point. The faces 106 and 116 rotate relatively and prevent leakage of oil from a chamber 167, while the O-ring 40 prevents leakage around the faces. The shaft seal 150 prevents foreign matter from getting to the faces when the foreign matter gets by a guard 168 into a space 169. Installation of the seal 100 may be accomplished by first pressing it into the bore 162 and then inserting the shaft member 164.

*A modified form of seal 200 (Fig. 3)*

Figure 3:
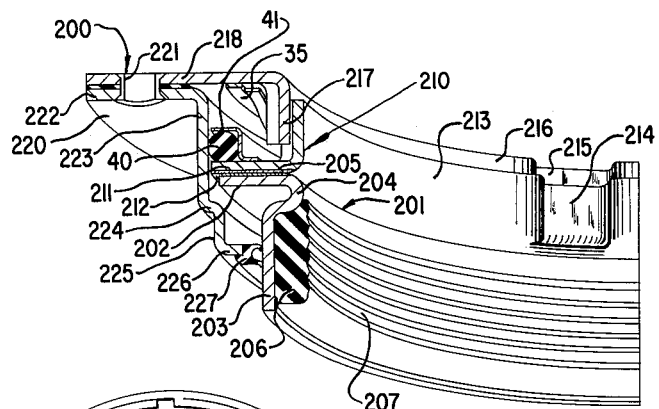
Fig. 3 is a view similar to Fig. 1, though on a reduced scale, of a unitized face seal embodying another modified form of the invention.

Fig. 3 shows a seal 200 which has some resemblance to the seal previously discussed and some significant differences. Its face sealing element 201 has a shotgun case structure similar to that of seal 100 in Fig. 1 with a radial flange 202 backed by a cylindrical portion 203 and shotgun turn 204 to impart a desired degree of rigidity to the lapped and ceramic coated face 205. An elastomeric member 206 is preferably bonded to the cylindrical portion 203 and is preferably provided with a roughened periphery 207 that fits snugly around the shaft member (not shown).

The other face member 210 has a face flange 211 with a lapped and coated face 212 and a cylindrical portion 213. The cylindrical portion 213 may be locked against torque by indentations 214 that are mated with indentations 215 in a case member 216. The case 216 has an axial cylindrical portion 217 and an end flange 218. The end flange 218 is preferably locked to a case 220 by rivets 221 that extend into an end flange 222 in the case 220.

The case 220 has a radially outer axial or cylindrical portion 223, a radially inwardly stepped portion 224, a radially inner axial or cylindrical portion 225, and a radially in-turned end wall 226. A double-lip dust seal 227, generally like the dust seal 150 in Fig. 1 is bonded to and supported by the end wall 226 and rides on the cylindrical portion 203 of the member 201. As in the seal 100, there is a finger spring 35, an elastomeric O-ring 40, and a keeper 41 which operate as in the seal 100. The general operation and installation of this seal are the same as that previously described. The seal 200 is drawn in its partially compressed (operational) position, whereas in its normal position prior to installation the back side of the flange 202 would engage the portion 224 due to the spring pressure.

*The seal 300 of Figs. 7–9*

The seal 300 shown in Figs. 7–9 also has two sheet metal face sealing elements 301 and 302. The face sealing element 301 has a radially extending face flange 303, a radially outer axially extending frusto-conical flange 304 providing the principal support for the lapped and ceramic-coated face 305, and a short radially inner flange 306.

The element 302 has a flange 309 lapped and surfaced to provide a face 310. Its radially inner periphery may be supported by a short stiffening axial flange 311, and its radially outer periphery is given the principal support by a longer axial flange 312. The axial flange 312 has an outer cylindrical surface 313 which is utilized as a shaft in conjunction with a dirt-excluding radial sealing element 314, which is part of an elastomeric body 315 that grips the radially outer surface 316 of the frusto-conical flange 304 of the face element 301. The shaft seal 314 is an axially extending unsupported portion of the body 315 and is provided with a lip 317 riding on the surface 313. The flange 312 may terminate in a short outwardly extending portion 318.

A sheet metal case 320 may be formed to provide two cylindrical, axially extending portions 321 and 322 joined by a generally radial step 323. It may also have a generally radially outwardly extending portion 324 at one end, which may be provided with a cup portion 325 as well as truly radial portion 326, and terminates in an axially out-turned portion 327. At its opposite end a radially out-turned flange 328 secures therein a sheet metal ring 330 having an axial portion 331 cupped in the portion 321 and a radial portion 332 that extends radially outwardly beyond the flange 328 and on the rear side of the axially extending flange 306 to unitize the seal. The flange 328 is, of course, turned over after assembly of the seal. The case 320 and ring 330 are locked together by indentations 333 and 334, as shown in Fig. 8.

Instead of the O-ring 40, a rubber bellows member 340 is employed. The member 340 has one base portion 341 mounted in the cup 325 and against the radial portion 326, and another radially extending portion 342 secured against the rear side of the flange 309 between the two axially extending portions 311 and 312. The radial portions 341 and 342 are connected by an axially extending diaphragm or bellows portion 343. Being a single molded unit, there is no danger of leakage through it, and leakage around it is prevented by the gasketing of its portions 341 and 342 against the flange 309 and the case portion 324. Integral guide buttons 344 and 345 may be provided for mounting coil springs 346. A flanged seating cup 347 may be employed at the end 342 in conjunction with the coil springs 346, if desired, as may a seating washer 348 at the opposite end 341.

Thus, the seal 300 does not employ a finger spring but rather a plurality of coil springs 346 as the resilient urging element holding the faces 305 and 310 in sealing engagement. The bellows 340 serves the same general function as the O-ring 40 and in addition holds the springs 346 in place. Also, the face members 301 and 302 are made of somewhat different configurations to provide the shape needed for retaining the bellows element 340 and for obtaining the desired sectional rigidity.

A typical installation of the seal 300 is shown in Fig. 9. A tapered roller bearing assembly includes a cone 350, a cup 351, a series of tapered roller bearings 352, and a cage 353. A housing 354 provides a bore 355 receiving the cup 351 and the outer periphery of the elastomeric body 315. A face 356 on the cup engages a face 357 of the body 315. An inner member 360 adjacent the cone 350 rides on a shaft 361 and its axle collar 362 engages the step 323. Then the flange 362 and face 356 force the sealing members 301 and 302 away from the flange 332, thereby compressing the bellows 343 as shown in Fig. 8. The faces 305 and 310 rotate relatively and prevent escape of lubricant from the bearing assembly, while the lip 317 rides on the surface 313 and wards off dirt, water, and other foreign matter from outside, such as particles worn off from brake linings and brake drums.

To those skilled in the art to which this invention relates, many additional changes in construction and widely differing embodiments of the invention will suggest themselves without departing from the spirit and scope of the invention as defined in the claims.

What is claimed is:

1. A unitized face seal having a pair of face-sealing elements, a case member unitizing said face seal by radial portions limiting the axial movement of said face-sealing elements within set limits between said radial portions, said case being torque-locked to one of said face-sealing elements, the other said element having a cylindrical portion, and a resilient shaft-sealing lip supported by said case in rotary sealing engagement with said cylindrical portion.

2. A unitized face seal comprising a first sheet-metal ring having a radial substantially flat sealing face and an axial flange; a second sheet-metal ring having a second radial sealing face in sealing contact with said first face and an axial flange; a rigid annular sheet-metal case having a cylindrical portion of larger diameter than either of said metal rings, a pair of radially inwardly extending portions and spaced from and on opposite sides of said sealing faces so as to prevent withdrawal of said sheet-metal rings from said case, and a portion splined to said axial flange of said second ring against relative rotation and for relative axial movement; and a shaft seal supported by said case in rotary sealing relation with the radially outer surface of said axial flange of said first ring and having a case element extending radially inwardly beyond the radially outer periphery of said first ring.

3. A unitized face seal comprising a first ring having a first radial substantially flat sealing face and a cylindrical portion; a second ring having a second sealing face similar to said first face and in sealing contact with said first face; a rigid annular metal case having a cylindrical portion of larger diameter than either of said metal rings, a portion splined to said second ring against relative rotation and for relative axial movement, and radially inturned portions preventing withdrawal of said rings from said case; and a shaft seal held by said case in rotary sealing relation with the radially outer surface of said cylindrical portion.

4. A unitized face seal comprising a first ring having a first radial sealing face and backed up by a cylindrical portion; a second ring having a second radial sealing face in sealing contact with said first face; an annular metal case having a pair of radially-extending members on opposite sides of said rings preventing withdrawal of said first ring from said case; said case being splined to said second ring against relative rotation and for relative axial movement; and a shaft seal supported by said case in rotary sealing engagement with the cylindrical portion of said first ring.

5. A unitized face seal comprising a first sheet-metal ring having a radial flange providing a first sealing face and a cylindrical flange; a second sheet-metal ring having a radial flange providing a second sealing face in sealing contact with said first face, and having an axial flange; an annular sheet-metal case having means preventing withdrawal of said rings from said case and splined to said axial flange of said second ring against relative rotation and for relative axial movement; a shaft seal supported by said case in rotary sealing engagement with the axial flange of said first ring; and spring means urging said second face against said first face.

6. The seal of claim 4 wherein said shaft seal comprises a separate member clamped into said case.

7. The seal of claim 4 wherein said shaft seal comprises an elastomeric member bonded to and supported by said case.

8. The seal of claim 4 wherein said shaft seal has a plurality of lips in said rotary sealing engagement with said cylindrical portion.

9. A unitized face seal comprising a first ring having a radial flange providing a substantially flat sealing face and backed up by an axial flange; a second ring having a radial flange providing a second sealing face in sealing contact with said first face, and having an axial flange extending away therefrom from the radially inner periphery of said radial flange of said second ring; a rigid annular metal case having an outer, stepped cylindrical portion of larger diameter than either of said metal rings, a radially inwardly extending web parallel to and spaced from said radial flange of said second ring on the opposite side from said second face, and an inner cylindrical portion splined to said axial flange of said second ring against relative rotation and for relative axial movement; and a shaft seal held against said outer cylindrical portion in rotary sealing relation with the radially outer surface of said axial flange of said first ring and extending radially inwardly beyond the radially outer periphery of said first ring so as to prevent withdrawal of said rings from said case.

10. A unitized face seal comprising a first sheet-metal ring having a radial flange providing a substantially flat sealing face and backed up by a shotgun-type case at its inner periphery and an axial flange; a second sheet-metal ring having a radial flange providing a second sealing face in sealing contact with said first face, and having an axial flange extending away therefrom from the radially inner periphery of said radial flange of said second ring; a rigid annular metal case having an outer, stepped cylindrical portion of larger diameter than either of said metal rings, a radially inwardly extending web parallel to and spaced from said radial flange of said second ring on the opposite side from said second face, and an inner cylindrical portion splined to said axial flange of said second ring against relative rotation and for relative axial movement, said outer stepped cylindrical portion terminating in a radially inturned edge; and a shaft seal held by said inturned edge in rotary sealing relation with the radially outer surface of said axial flange of said first ring and having a case element extending radially inwardly beyond the radially outer periphery of said first ring so as to prevent withdrawal of said sheet-metal rings from said case.

11. A unitized face seal comprising a first sheet-metal ring having a radial flange providing a first sealing face and backed up by a shotgun-case corner at its inner periphery and an axial flange; a second sheet-metal ring having a radial flange providing a second sealing face in sealing contact with said first face, and having an axial flange extending away therefrom from the radially inner periphery of said radial flange of said second ring, the radially outer periphery of said second face being unsupported; a rigid annular metal case having an outer, outwardly stepped, cylindrical portion of larger diameter than either of said metal rings, and a radially inwardly extending web parallel to and spaced from said radial flange of said second ring on the opposite side from said second face, and an inner cylindrical portion splined to said axial flange of said second ring against relative rotation and for relative axial movement, the radially outer part of said outer cylindrical portion terminating in a radially inturned edge; a shaft seal held by said case by the step and said radially inturned edge in rotary sealing relation with the radially outer surface of said axial flange of said first ring and preventing withdrawal of said sheet-metal rings from said case, said radial and axial flanges of said second ring and said smaller diameter cylindrical portion and web of said case enclosing an annular space of generally rectangular cross-section; an O-ring in said space sealing between said second ring and the radially inner surface of said smaller-diameter cylindrical portion; an O-ring retainer ring having radially inner and outer radial flanges connected by an axial flange, the radially inner radial flange abutting the back of said second ring's radial flange so that said O-ring is confined between said radially outer radial flange, said axial flange, said inner surface, and the back of the radial flange of said second ring; and spring means urging said inner radial flange of said O-ring retainer ring against said radial flange of said second ring and thereby urging said second face against said first face.

12. A unitized face seal comprising a first ring having a radial flange providing a first sealing face and backed up by an axial flange; a second ring having a radial flange providing a second sealing face in sealing contact with said first face, and having an axial flange extending away from said face on the radially inner periphery of said radial flange of said second ring; an annular metal case having an outer cylindrical portion with a portion of larger diameter than either of said rings and terminating in a first radially-extending end wall at one end and spaced from said radial flange of said first ring on the side opposite said first flange and preventing withdrawal of said first ring from said case; a second radially extending end wall at the other end parallel to and spaced from said radial flange of said second ring on the opposite side from said second face, and having an inner cylindrical flange splined to said axial flange of said second ring against relative rotation and for relative axial movement; a shaft seal supported by said first end wall in rotary sealing engagement with the axial flange of said first ring; means sealing between said second ring and the inner surface of said outer cylindrical portion; and spring means urging said second face against said first face.

13. A unitized face seal comprising a first sheet-metal ring having a radial flange providing a first sealing face and backed up by a shotgun-case corner on its inner pehiphery and an axial flange; a second sheet-metal ring having a radial flange providing a second sealing face in sealing contact with said first face, and having an axial flange extending away from said face on the radially inner periphery of said radial flange of said second ring, the radially outer periphery of said second face being unsupported; a rigid annular metal case having an outer cylindrical portion with a portion of larger diameter than either of said rings and terminating in a first radially-extending end wall, a second radially extending end wall at the other end of said cylindrical portion parallel to and spaced from said radial flange of said second ring on the opposite side from said second face, and a radially inner cylindrical flange joined to said second end wall and splined to said axial flange of said second ring against relative rotation and for relative axial movement, said first end wall being spaced from said radial flange of said first ring on the side opposite said first flange and preventing withdrawal of said first ring from said case, said second ring and said cylindrical portions of said case and said second end wall defining an annular space of rectangular cross-section; a shaft seal supported by said first end wall in rotary sealing engagement with the axial flange of said first ring; an O-ring in said space sealing against the inner surface of said cylindrical portion; an O-ring retainer ring confining said O-ring between said retainer ring and said inner surface, and the back of the radial flange of said second ring; and spring means urging said O-ring retainer ring against said radial flange of said second ring and thereby urging said second face against said first face.

14. A unitized face seal comprising a first ring having a supported radial flange providing a first sealing face; a second ring having a supported radial flange providing a second sealing face in sealing contact with said first face; an annular metal case having a cylindrical portion of smaller diameter than either of said rings, a first radially outwardly extending portion spaced away from said radial flange of said second ring on the opposite side from said second face, and a second radially outwardly extending portion at the opposite end of said cylindrical portion beyond the radial flange of said first ring preventing withdrawal of said rings from said case; a resilient member supported by said first ring in rotary sealing engagement with said second ring; and means between said first radial portion and the radial flange of said second ring for holding said faces in rotary sealing contact.

15. A unitized face seal comprising a first sheet-metal ring having a radial flange providing a first sealing face and backed up by an inner flange and an outer frustoconical flange, both extending axially away from said radial flange and said outer flange extending radially inwardly therefrom; a second sheet-metal ring having a radial flange providing a second sealing face in sealing contact with said first face and having radially inner and outer axial flanges extending away from said radial flange on the side opposite its said face; a rigid annular metal case having a cylindrical portion of smaller diameter than either of said sheet-metal rings and having a radially outwardly extending portion spaced away from said radial flange of said second ring on the opposite side from said second face, said case also having a radially out-turned unitizing ring at the opposite end of its said cylindrical portion beyond the end of said inner flange of said first ring and preventing withdrawal of said rings from said case; an annular elastomeric lip supported by said first ring in rotary sealing engagement with the outer periphery of the outer axial flange of said second ring; a bellows member seated in the radially extending portion of said case and having a flexing axial portion and a retaining radial portion connected to the axial portion and bearing against the back of said radial flange of said second ring; and spring means urging said radial portion of said bellows member toward said radial flange of said second ring and thereby urging said second face against said first face.

References Cited in the file of this patent

UNITED STATES PATENTS

| | | |
|---|---|---|
| 2,300,385 | Kollberg et al. | Oct. 27, 1942 |
| 2,393,260 | Pardee | Jan. 22, 1946 |
| 2,465,546 | Marslek | Mar. 29, 1949 |
| 2,747,901 | Clavell | May 29, 1956 |
| 2,790,523 | Fawick et al. | Apr. 30, 1957 |